US012654380B2

(12) United States Patent

Forichon et al.

(10) Patent No.: US 12,654,380 B2
(45) Date of Patent: Jun. 16, 2026

(54) SYSTEM FOR CONTINUOUS MANUFACTURING OF SEMI-FINISHED PRODUCTS

(71) Applicant: COMPAGNIE GENERALE DES ETABLISSEMENTS MICHELIN, Clermont-Ferrand (FR)

(72) Inventors: Baptiste Forichon, Clermont-Ferrand (FR); Benjamin Dault, Clermont-Ferrand (FR)

(73) Assignee: COMPAGNIE GENERALES DES ETABLISSEMENTS MICHELIN, Clermont-Ferrand (FR)

( * ) Notice: Subject to any disclaimer, the term of this patent is extended or adjusted under 35 U.S.C. 154(b) by 105 days.

(21) Appl. No.: 18/708,715

(22) PCT Filed: Nov. 8, 2022

(86) PCT No.: PCT/EP2022/081122
§ 371 (c)(1),
(2) Date: May 9, 2024

(87) PCT Pub. No.: WO2023/083807
PCT Pub. Date: May 19, 2023

(65) Prior Publication Data
US 2025/0010533 A1 Jan. 9, 2025

(30) Foreign Application Priority Data
Nov. 9, 2021 (FR) ...................................... 2111852

(51) Int. Cl.
*B29C 48/00* (2019.01)
*B29C 48/025* (2019.01)
(Continued)

(52) U.S. Cl.
CPC ...... *B29C 48/0021* (2019.02); *B29C 48/0022* (2019.02); *B29C 48/0255* (2019.02);
(Continued)

(58) Field of Classification Search
CPC ................ B29D 30/00; B29D 30/0061; B29D 2030/0072–0083; B29L 2030/00;
(Continued)

(56) References Cited

U.S. PATENT DOCUMENTS 8,783,321 B2 7/2014 Sevaille et al.
11,951,700 B2 4/2024 Portier et al.
(Continued)

FOREIGN PATENT DOCUMENTS

CN 204204811 U 3/2015
CN 104589627 A 5/2015
(Continued)

OTHER PUBLICATIONS

International Search Report dated Feb. 17, 2023, in corresponding PCT/EP2022/081122 (2 pages).

*Primary Examiner* — Carson Gross
(74) *Attorney, Agent, or Firm* — VENABLE LLP

(57) ABSTRACT

A system (1), for continuous manufacturing of semi-finished products including at least one electronic device (5) positioned between two strips (10, 14) of extruded elastomeric material, includes: conveying means, extrusion means (11) delivering a first extruded strip (10) of elastomeric material and a second extruded strip (14) of elastomeric material, means for feeding the electronic device (5), and cutting means (23). The extrusion means (11) include heating means allowing the hot extrusion of the strips (10, 14), and the conveying means include at least one means (30) for holding the electronic device (5) in place in a longitudinal direction.

9 Claims, 1 Drawing Sheet

(51) Int. Cl.
 *B29C 48/07* (2019.01)
 *B29C 48/15* (2019.01)
 *B29C 48/21* (2019.01)

(52) U.S. Cl.
 CPC .............. *B29C 48/07* (2019.02); *B29C 48/15* (2019.02); *B29C 48/21* (2019.02)

(58) Field of Classification Search
 CPC ........... B29C 48/0021; B29C 48/0022; B29C 48/0255; B29C 48/07; B29C 48/15; B29C 48/21; B29K 2007/00; B29K 2009/00; B29K 2009/06
 See application file for complete search history.

(56) References Cited

U.S. PATENT DOCUMENTS

| | | |
|---|---|---|
| 2011/0284155 A1 | 11/2011 | Sevaille et al. |
| 2022/0176663 A1 | 6/2022 | Portier et al. |
| 2025/0001662 A1 | 1/2025 | Forichon et al. |

FOREIGN PATENT DOCUMENTS

| | | | | |
|---|---|---|---|---|
| EP | 2303558 B1 | 8/2018 | | |
| EP | 3756870 A1 | 12/2020 | | |
| WO | 2010/007283 A1 | 1/2010 | | |
| WO | 2013/146593 A1 | 10/2013 | | |
| WO | 2020/208131 A1 | 10/2020 | | |
| WO | WO-2020208132 A1 * | 10/2020 | ....... | G06K 19/07718 |
| WO | 2020/225668 A1 | 11/2020 | | |

* cited by examiner

[Fig 1]
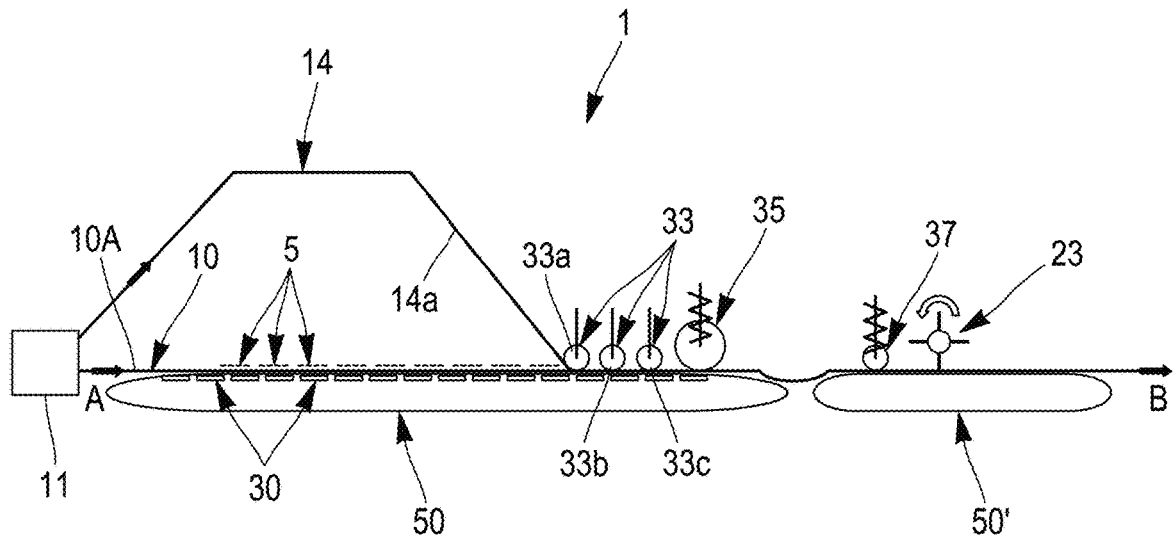
[Fig 2]
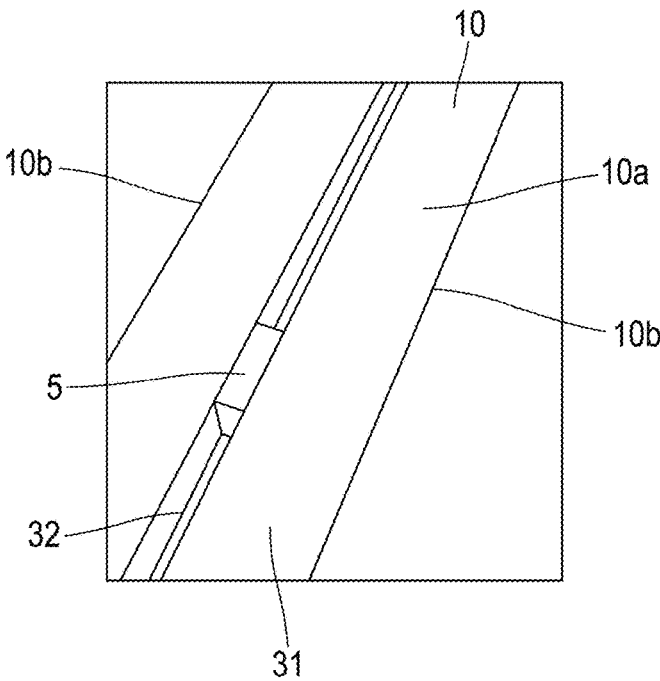

SYSTEM FOR CONTINUOUS MANUFACTURING OF SEMI-FINISHED PRODUCTS

TECHNICAL FIELD

The invention relates to a system that performs a process for continuous manufacturing of semi-finished products, and particularly semi-finished products incorporating an RFID electronic device, in particular for the tire industry.

Context

In the field of tire manufacturing, it is known to incorporate an electronic device into a tire. For example, a passive radiofrequency identification transponder (or "RFID") can store data relating to the tire (for example, data corresponding to the specifications and/or history of the tire). In order to improve the quality of the transmission of the data stored in the electronic device, it is also known to first encapsulate the electronic device in rubber so as to protect it during storage before it is incorporated into a tire.

Processes for encapsulating an electronic device are disclosed in the prior art. For example, EP3756870A1 discloses a process for inserting an electronic device between two rubber strips. Such a process consists of positioning a first rubber strip so that it can receive an electronic device, covering this assembly with a second rubber strip, and pressing the two strips before cutting them to produce individual portions, each incorporating an electronic device. However, this process has the drawback of lacking precision in the positioning of the electronic device on the first rubber strip, as well as causing damage during the cutting of the individual portions. As a result, this solution prevents the performance of a continuous process, to the detriment of industrial operability.

The Applicant overcomes such drawbacks with the process disclosed in publication EP2303558B1. The disclosed process relates to the manufacturing of at least one tire member incorporating at least one electronic device encapsulated in rubber. During the process, the electronic device is placed in contact with a first rubber strip, and it is covered with a second rubber strip so as to encapsulate the device. The two rubber strips travel at substantially the same speed from a first zone, in which the two rubber strips are separate, to a second zone, in which the two respective faces of the two rubber strips are in contact with each other.

In addition, in publications WO2020/208131 and WO2020/208132, the Applicant discloses processes for encapsulating an electronic device in a profiled strip consisting of an elastomeric material.

The Applicant has devised continuous manufacturing processes that provide the benefit of holding the electronic device during the cutting of the individual portions. In the invention disclosed herein, the Applicant adds to these benefits with the insertion of the electronic device into hot-extruded strips of elastomeric material. By combining these elements, high-quality semi-finished products are obtained on an industrial scale, without compromising the operation of the electronic device.

SUMMARY OF THE INVENTION

The invention relates to a system for continuous manufacturing of semi-finished products incorporating at least one electronic device, communicating by radiofrequency (RFID), positioned between two strips of extruded elastomeric material, the system including:

conveying means, extrusion means delivering a first extruded strip of elastomeric material and a second extruded strip of elastomeric material, means for feeding the electronic device, and cutting means, characterized in that the extrusion means include heating means allowing the hot extrusion of the strips, and in that the conveying means include at least one means for holding the electronic device in place in a longitudinal direction.

In one embodiment of the system of the invention, the extrusion means include at least one extruder selected from a single extruder having two different extruded material outputs and a pair of communicating extruders each extruding one strip.

In certain embodiments of the system of the invention, the heating means include one or more means for circulating a heat transfer fluid.

In certain embodiments of the system of the invention, the conveying means include at least one of:

a motorized conveyor that transports the first strip exiting the extrusion means;

a downstream motorized conveyor that transports the semi-finished products obtained using the process of the invention to the cutting means; and a set of drive rollers arranged so that they convey the strips from a zone situated at the output of the extrusion means to a downstream zone in which an upper face of the first strip and a lower face of the second strip are placed in contact with each other.

In certain embodiments of the system of the invention, the means for holding the electronic device in place include one or more magnetic elements positioned uniformly relative to the conveyor.

In certain embodiments of the system of the invention, the conveying means are controlled so that the two strips travel at the same substantially constant speed.

In certain embodiments of the system of the invention, the system further includes a roller system that applies a force to the second strip while it is travelling so that the electronic device is encapsulated between the two strips.

In certain embodiments of the system of the invention, the roller system includes:

one or more lamination roller(s);

a first pressing roller; and a second pressing roller.

In certain embodiments of the system of the invention, the lamination rollers include:

a first lamination roller that lowers the strip onto the strip, a second lamination roller that is used to refine the centering of the electronic device, and a third lamination roller that is used to place the strip in contact with the electronic device.

In certain embodiments of the system of the invention, during a cycle of production of semi-finished products performed by the system:

the first pressing roller exerts a force of up to 250 newtons (N) on the second strip; and the second pressing roller exerts a force of up to 20 newtons (N) on the second strip;

so that all of the elements, namely the first strip, the second strip and the electronic device, are in contact with each other.

In certain embodiments of the system of the invention, the means for holding the electronic device are selected from permanent magnets, non-permanent magnets, electromagnets and combinations thereof.

In certain embodiments of the system of the invention, the extrusion means include means for forming a groove.

In certain embodiments of the system of the invention, the means for feeding the electronic device include a feed belt having one device per cell.

Further aspects of the invention will become obvious from the following detailed description.

BRIEF DESCRIPTION OF THE DRAWINGS

The nature and various advantages of the invention will become more evident from reading the following detailed description, and from studying the appended drawings, in which the same reference signs denote identical parts throughout, and in which:

FIG. 1 is a schematic cross-sectional view of system according to the invention, FIG. 2 is a schematic perspective view of a portion of the surface of the first strip of elastomeric material.

DETAILED DESCRIPTION

With reference to the figures, in which the same reference signs denote identical elements, FIG. 1 shows an embodiment of a system 1 that performs a process for continuous manufacturing of semi-finished products (or "process") of the invention. The system 1 could form part of a facility for producing rubber products (for example, tires and/or rubber products for manufacturing tires). The process of the invention as performed by the system 1 differs in that a first strip 10 of elastomeric material and a second strip 14 of elastomeric material are hot-extruded. The process as performed by the system 1 also differs in that an electronic device 5 (RFID) is held by means 30 for holding it in place on the first strip 10 of elastomeric material. The two strips 10, 14 are extruded by extrusion means 11 including at least one known extruder. It will be understood that the two strips 10, 14 can be extruded substantially simultaneously by a single extruder. It will also be understood that each strip 10, 14 can be extruded by a pair of communicating extruders. In both cases, the two strips could be extruded with different dimensions (for example, different widths, heights and/or thicknesses) allowing the manufacturing of a variety of semi-finished products.

Once generated by the extrusion means 11, the strips 10, 14 are guided by one or more conveying means, and follow different paths. The first strip 10, which is situated along its entire path under the second strip 14, has an upper face 10a oriented facing a lower face 14a of the second strip 14. It will be understood that the conveying means are controlled so that the two strips 10, 14 travel at the same substantially constant speed.

The conveying means of the system 1 include a motorized conveyor 50 that transports the first strip 10 exiting the extrusion means 11 toward downstream processes (see arrow A in FIG. 1). The conveyor 50 permits placement of the electronic device 5 on the upper face 10a of the first strip 10. The conveying means also include a motorized conveyor 50' that transports the semi-finished products obtained using the process of the invention toward a cutting means 23 (described below) and toward other facilities downstream of the cutting means (see arrow B in FIG. 1). The conveyor 50 allows continuous cutting of the semi-finished product including the assembly of the two strips 10, 14 with the electronic device 5 between them. It will be understood that the conveyors 50, 50' could be replaced by a single conveyor or by other equivalent known transfer means.

The conveying means also include a set of drive rollers (not shown) arranged so that they convey the strips 10, 14 from a zone situated at the output of the extrusion means 11 to a downstream zone in which the two respective faces 10a, 14a of the two strips 10, 14 are placed in contact with each other (see, for example, the conveying means disclosed in the Applicant's European patent EP23033558B1).

More particularly, the extruded elastomeric material according to the invention is obtained without assembling constituent elements after extrusion, thus forming a profiled strip having a longitudinal direction, defined as being preferably parallel to the direction of extrusion of the strip of elastomeric material. The plane perpendicular to the longitudinal direction is defined as the transverse plane. For the conveyor belt, a longitudinal direction is defined that corresponds to the direction of travel of the conveyor belt. According to the invention, the longitudinal direction of the conveyor belt and the longitudinal direction of the extruded strip are coincident when the extruded strip is positioned on the conveyor belt.

In one embodiment of the invention, the two strips 10, 14 are extruded at a temperature of approximately 100° C. The benefit of hot extrusion is that an elastomeric material with a Shore hardness of 30 is obtained at the output of the extruder, which subsequently facilitates the placement and holding in place of the electronic device 5 between the first and second strips 10, 14 of elastomeric material.

The extrusion means 11 of the system 1 include one or more integrated heating means for the hot extrusion of the strips 10, 14. In one embodiment, the heating means are selected from one or more means for circulating a heat transfer fluid as known to a person skilled in the art.

The material exiting the extrusion means 11 at a temperature of approximately 100° C. is then temperature controlled using an output rail (not shown) maintained at a temperature of approximately 45° C. This temperature control makes it possible to maintain a cutting temperature of between approximately 43° C. and 45° C. for complete cutting of the two strips 10, 14 sandwiching the electronic device 5. During cutting, the temperature of the extruded material must not be too hot (resulting in excessive adhesion of the extruded material to the conveyor belt) or too cold (resulting in a poor-quality cut).

The tackiness in the raw state of the elastomeric material of the hot-extruded strips 10, 14 is improved. This increased tackiness facilitates the maintenance of the electronic device 5 and the assembly of the strips 10, 14.

The extrusion temperature is controlled in order to avoid the premature vulcanization of the two strips 10, 14 and of the electronic device 5. This vulcanization step takes place subsequently with the tire casing on which the semi-finished product obtained according to the process of the invention will be placed.

The one-piece first strip 10 has two edges 10b that extend longitudinally and substantially parallel to each other (see FIG. 2). A width is defined by this strip that is measured in the projection of the strip onto a horizontal plane in the transverse direction. In one embodiment, the first strip 10 has a width of between 8 mm and 20 mm inclusive, and preferably between 10 mm and 16 mm inclusive.

The first one-piece strip 10 according to the invention includes a receiving zone for the electronic device 5. By receiving zone it is understood to mean a zone suitable for receiving the electronic device 5. The electronic device 5 is positioned using gripping means actuated by a robotic system as known to a person skilled in the art.

The holding in place of the electronic device 5 is further facilitated by the presence of means 30 for holding it in place. In one embodiment, the means 30 for holding the electronic device in place include magnetic means positioned on the upper face 10a of the travelling strip 10. The presence of such magnetic means prevents movement of the electronic device 5, even by an infinitely small amount, before it is covered by the second strip 14. The means 30 for holding the electronic device in place can include multiple magnetic elements positioned uniformly relative to the conveyor 50 (for example, incorporated into the conveyor 50 as shown in FIG. 1, positioned under the conveyor 50, etc.). Such positioning permits maintenance of the electronic device 5 continuously along the entire assembly line. The means 30 for holding the electronic device in place can also include an electromagnetic system or its equivalent. The electronic device 5 is positioned in the longitudinal direction of the conveyor 50.

The first strip 10 of elastomeric material can have a different width from the strip 14 of elastomeric material. When the strips 10, 14 are different widths, the first strip 10 is wider than the strip 14. In one embodiment, the strips 10, 14 can each have a thickness of between 1 mm and 3 mm inclusive. The thickness of the strips 10, 14 can be identical or different. For tires intended for passenger vehicles and vans, the thickness of each strip is between 1 mm and 2 mm inclusive. For tires intended for heavy goods vehicles, the thickness of each strip is between 1 mm and 7 mm inclusive.

Such a specific feature can make it easier to hold the electronic device 5 in place during the application of the second strip 14. As the second strip 14 secures the perimeter of the electronic device 5 when it is applied, its smaller width makes it possible to facilitate both the holding and the confinement of the electronic device between the first strip 10 and the second strip 14.

As shown in FIG. 2, a receiving zone 31 for the electronic device 5 can include a groove 32 extending in the longitudinal direction of the first strip 10 and having suitable dimensions for receiving the electronic device 5. The groove 32 can preferably have a width of approximately 2 mm and a depth of approximately 1 mm. As shown in FIG. 2, the groove 32 is positioned substantially along a longitudinal axis of the first strip 10. It will be understood that the positioning of the groove 32 relative to the edges of the first strip 10 is not limited. In FIG. 2, the electronic device 5 is positioned in the volume of the groove 32 in the longitudinal direction. The geometric shape of the groove 32 is preferably suitable for satisfactorily receiving the electronic device 5 while hugging the outline thereof. In one embodiment, the shape of the groove 32 can be rectangular or triangular.

The electronic device 5 is placed in the groove 32 by known feeding means (not shown). In one embodiment of the system 1, the means for feeding the electronic device 5 include a feed belt having one device per cell (for example, of the type disclosed by the Applicant in EP2303558B1).

It will be understood that an optional corresponding groove could be incorporated into the lower face 14a of the strip 14. In such an embodiment, the groove incorporated into the lower face 14a of the strip 14 is aligned with the groove defined in the upper face 10a of the first strip 10.

The presence of this groove 32, whether or not combined with the means 30 for holding the electronic device in place, consolidates the holding in place of the electronic device 5 on the first strip 10 while it is travelling on the conveyors 50, 50'.

Once the electronic device 5 has been placed on the first strip 10, a second strip 14 of elastomeric material is deposited on this assembly consisting of the first strip 10 and the electronic device 5. The second strip 14 is also hot extruded according to the same principle as the first strip 10 (that is, extrusion takes place at a temperature of approximately 100° C.). In one embodiment, the dimensions of this second strip 14 are substantially similar to those of the first strip 10.

After it has been placed on the first strip 10, the second strip 14 is deformed by the utilization of an application force in a predetermined direction, thus encapsulating the electronic device 5 between the two strips 10, 14. The force is exerted by means of known devices, such as a system of rollers, belts and/or their equivalents. The forces applied depend upon the nature of the elastomeric strips used.

When a roller system is used, the second strip 14 is applied progressively onto the first strip 10 using a roller system having one or more lamination rollers 33, a first pressing roller 35 and a second pressing roller 37. As shown in FIG. 1, the lamination rollers 33 include a first lamination roller 33a that lowers the strip 14 onto the strip 10, a second lamination roller 33b that refines the centering of the electronic device 5, and a third lamination roller 33c that places the strip 14 in contact with the electronic device 5. It is understood that the lamination rollers 33 could be replaced by one, two or multiple equivalent rollers.

The first pressing roller 35 permits placement of the strip 14 in contact with the strip 10 on either side of the electronic device 5. In one embodiment, the first pressing roller 35 includes a foam roller. In one embodiment, the force applied by the first pressing roller 35 is approximately 250 N.

The second pressing roller 37 is used to exert a weak force so that all of the elements, namely the first strip 10, the second strip 14 and the electronic device 5, are firmly in contact with each other. In one embodiment, the force applied by the second pressing roller 35 is approximately 20 N.

The first and second strips 10, 14 of elastomeric material have an identical or different chemical composition. The elastomeric material preferably has a Mooney plasticity in the raw state of between 30 and 90 Mooney Units (MU), preferably between 50 and 70 MU. This elastomeric material is preferably an electrical insulator, preferably with a dielectric constant measured at 915 MHz of less than 6.5.

The elastomeric material contains 100 phr (parts by weight per 100 parts of elastomer) of an elastomer such as EPDM (ethylene propylene diene monomer rubber), butyl rubber, neoprene or a diene elastomer such as SBR (styrene-butadiene rubber), polybutadiene, natural rubber or polyisoprene.

The elastomeric material includes silica, carbon black, chalk and kaolin fillers:

With a silica filler in a maximum amount of 50 phr,

With a carbon black filler of ASTM grade higher than 700, in an amount less than 50 phr, With a carbon black filler of ASTM grade lower than or equal to 500, in a maximum amount of 20 phr.

It is possible to add to or replace these fillers with chalk or kaolin.

When the elastomeric material includes silica fillers, it can also include agents for coupling the silica to the elastomers. Such coupling agents are well known to a person skilled in the art. Such amounts and types of fillers make it possible to ensure a relative permittivity, or dielectric constant, of less than 6.5, in particular at a frequency of 915 MHz.

The stiffness in the cured state of the elastomeric material is preferably less than or similar to those of the adjacent compounds when, at the end of the process according to the invention, the assembly consisting of a portion of first and second strips 10, 14 and an electronic device 5 is incorporated into a rubber article.

The electrically insulating elastomeric material preferably has an adhesion promoter for bonding it to the electronic device. This promoter can be a salt of cobalt or nickel, for example cobalt naphthenate in an amount less than 3 phr and with a suitable amount of sulphur, of the order of 5 to 7 phr.

The first and second strips 10, 14 are obtained continuously, without any interruption linked for example to replenishing materials.

The electronic device 5 can be any type of electronic device. In particular, the electronic device 5 can be a passive radiofrequency identification transponder, often identified by the acronym RFID (Radio-Frequency IDentification).

Here, the term "radiofrequency transponder" is given to mean that the radiofrequency transponder is interrogated from the outside thereof and passively. The interrogation phases therefore do not require the radiofrequency transponder to have its own power supply. The function of the radiofrequency transponder is primarily a role of identifying the rubber article into which it is incorporated, for example a tire casing.

Radiofrequency transponders usually include an electronic chip and a radiating antenna that is able to communicate with a radiofrequency reader. In particular, the communication frequency of the radiofrequency transponder is situated in the ultra-high-frequency (UHF) band between 300 MHz and 3 GHZ, allowing an advantageous compromise to be obtained between the small size of the radiating antenna, allowing the antenna to be easily incorporated into the two strips 10, 14 for a tire casing, and the large distance from which the radiofrequency transponder is readable, far from the tire casing. Advantageously, the radiofrequency transponder communicates in the narrow frequency band of between 860 MHz and 960 MHz, and more specifically in the very narrow bands of 860 MHz to 870 MHZ, and 915 MHz to 925 MHz. At these frequencies, the conventional elastomer compounds of the tire casing constitute a good compromise with respect to the propagation of radio waves. In addition, these frequencies are as high as possible in order to minimize the size of the radiating antenna so as to make it easier to incorporate the radiofrequency transponder embedded in a rubber patch into the tire casing.

According to a first embodiment, the radiating antenna has two helical antenna segments, and the electronic chip is galvanically connected to the two helical antenna segments.

According to another embodiment, the radiofrequency transponder also includes a primary antenna electrically connected to the electronic chip, in which the primary antenna is inductively coupled to the radiating antenna, and in which the radiating antenna is a dipole antenna consisting of a single-strand helical spring. This second embodiment has the advantage of mechanically separating the radiating antenna from the electronic components of the transponder, and thus of eliminating the weak point of conventional transponders, namely the zone in which the antenna segments are fastened to the carrier of the electronic chip.

When the two strips 10, 14 and the electronic device 5 are assembled, a force is applied that varies depending on the chemical nature of the strips 10, 14 and the shape of the electronic device 5. Insofar as the extrusion takes place at a temperature of approximately 100° C., the force is almost non-existent, as each of the constituents of the semi-finished product obtained according to the invention remains correctly in its initial place.

However, it might become necessary to exert a force to ensure improved adhesion between the first strip 10 and the second strip 14. When a force is applied, it is identical over the assembly consisting of the strips 10, 14 and the electronic device 5.

Following this assembly step, the semi-finished products obtained are cut using cutting means 23. These cutting means, for example rotary (as known to a person skilled in the art), include at least one blade for cutting the two strips 10, 14 simultaneously, quickly and cleanly, the blade of the cutting means penetrating far better a hot elastomeric material. The cutting means 23 include between one and four blades and can operate in both pressure mode and cutting setting mode. The surface of each blade can include a non-stick coating preventing the elastomeric material from adhering even infinitesimally. Non-stick coating is well known to a person skilled in the art.

The cutting step is obviously synchronized with the preceding steps of the process according to the invention.

Other possible cutting means can be selected, for example, from ultrasound cutting, stamping, laser, plasma and water jet cutting, non-rotary linear cutting using a guillotine, shearing and rotary disc cutting.

Once cutting has been performed, the semi-finished products obtained are conveyed to one or more facilities downstream of the system 1 (see arrow B in FIG. 1). For example, the semi-finished products obtained can be stored on a winding and labelling device.

The process for continuous manufacturing of semi-finished products performed by the system 1 can take place under PLC control and can include pre-programming of management information. For example, process settings can be associated with the properties of the elastomeric materials and the number of semi-finished products planned during a manufacturing cycle. A monitoring system could be put in place in any part of a facility for producing rubber products incorporating the system 1. At least one part of the monitoring system can be supplied in a portable device such as a mobile network device (for example a mobile telephone, a laptop computer, a camera, one or more portable devices connected to the network (including "augmented reality" and/or "virtual reality" devices, wearable clothing connected to the network and/or any combinations and/or any equivalents)).

In certain embodiments of the invention, the system 1 (and/or a facility for producing rubber products incorporating the system 1) can receive voice commands or other audio data (representing, for example, a start or a stop of a production cycle of the semi-finished products if the required properties of the cycle are not achieved). The command can include a request for the current status of a process for continuous manufacturing of semi-finished products. A generated response can be represented audibly, visually, in a tactile manner (for example, by way of a haptic interface) and/or in a virtual or augmented manner.

In one embodiment, the process of the invention can include a step of training the system 1 (or training a facility for producing rubber products that incorporates the system 1) to recognize representative values of the strips 10, 14 exiting the extrusion means 11 (for example, temperature and viscosity values) and to perform a comparison with target values. This step can include a step of training the system 1 to recognize a lack of equivalence between the compared values. Each training step can include a classification generated by self-learning means. This classification can include, but is not limited to, the parameters of the elastomeric materials of the strips 10, 14, the dimensions of the strips 10, 14, the dimension and positioning of the groove 32, the configuration of the cutting means 23, the durations of the semi-finished product production cycles incorporating the process of the invention, and the required values at the end of a current manufacturing cycle. It is conceivable for one or more detection and comparison steps to be able to be performed iteratively. In certain embodiments, the data obtained can feed one or more neural networks that manage the system 1 and/or one or more production facilities into which one or more systems 1 are incorporated. The process according to the invention maintains a constant feed and replenishment speed and therefore a constant processing speed of the initial components without any slowing in production rate, due to the fast, complete adhesion of the strips 10, 14 when they are assembled. The process disclosed takes advantage of the contact between the first and second strips to bond them correctly and quickly due to the high tackiness of the materials forming the strips.

In addition, the process according to the invention achieves very high quality cutting of the strips 10, 14 due to the securing of the electronic devices 5 in the longitudinal direction. The process according to the disclosed invention thus facilitates cutting as the electronic devices 5 are better centered on the first extruded strip as soon as its starts to travel.

The terms "at least one" and "one or more" are used interchangeably. The ranges given as lying "between a and b" encompass the values "a" and "b".

Although particular embodiments of the disclosed apparatus have been illustrated and described, it will be appreciated that various changes, additions and modifications can be made without departing from either the spirit or scope of the present description. Therefore, no limitation should be imposed on the scope of the invention described, apart from those set out in the appended claims.

The invention claimed is:

1. A system for continuous manufacturing of semi-finished products comprising at least one electronic device communicating by radiofrequency, positioned between two strips of extruded elastomeric material, the system comprising:

conveying means;

extrusion means delivering a first extruded strip of elastomeric material and a second extruded strip of elastomeric material;

means for feeding the electronic device;

cutting means; and a roller system that applies a force to the second strip while the second strip is travelling so that the electronic device is encapsulated between the two strips, wherein the extrusion means comprise heating means allowing hot extrusion of the two strips, wherein the conveying means comprise at least one means for holding the electronic device in place in a longitudinal direction,

wherein the roller system comprises:

at least one lamination roller;

a first pressing roller; and a second pressing roller, and wherein the at least one lamination roller comprises:

a first lamination roller that lowers the second strip onto the first strip;

a second lamination roller that refines a centering of the electronic device; and a third lamination roller that places the second strip in contact with the electronic device.

2. The system according to claim 1, wherein the extrusion means comprise at least one extruder selected from a single extruder comprising two different extruded material outputs and a pair of communicating extruders each extruding a strip.

3. The system according to claim 1, wherein the heating means comprise one or more means for circulating a heat transfer fluid.

4. The system according to claim 1, wherein the conveying means comprise at least one of:

a motorized conveyor that transports the first strip leaving the extrusion means;

a downstream motorized conveyor that transports the semi-finished products to the cutting means; and a set of drive rollers arranged to convey the two strips from a zone situated at an output of the extrusion means to a downstream zone in which an upper face of the first strip and a lower face of the second strip are placed in contact with each other.

5. The system according to claim 4, wherein the at least one means for holding the electronic device in place comprise one or more magnetic elements positioned uniformly relative to the conveyor.

6. The system according to claim 1, wherein the conveying means are controlled so that the two strips travel at a same substantially constant speed.

7. The system according to claim 1, wherein, during a cycle of production of semi-finished products performed by the system, the first pressing roller exerts a force of up to 250 newtons (N) on the second strip, and the second pressing roller exerts a force of up to 20 newtons (N) on the second strip such that the first strip, the second strip and the electronic device are in contact with each other.

8. The system according to claim 1, wherein the means for holding the electronic device are selected from permanent magnets, non-permanent magnets, electromagnets and combinations thereof.

9. The system according to claim 1, wherein the means for feeding the electronic device comprise a feed belt having one device per cell.

\* \* \* \* \*